(No Model.)

G. H. MOORE.
VALVE.

No. 384,330. Patented June 12, 1888.

Witnesses
A. G. Holman
R. T. Chapman

Inventor
George H. Moore.
By Hawes & Chapman
Attorneys.

UNITED STATES PATENT OFFICE.

GEORGE H. MOORE, OF NORWICH, CONNECTICUT, ASSIGNOR TO ESTELLE C. MOORE, OF SAME PLACE.

VALVE.

SPECIFICATION forming part of Letters Patent No. 384,330, dated June 12, 1888.

Application filed May 20, 1887. Serial No. 238,855. (No model.)

*To all whom it may concern:*

Be it known that I, GEORGE H. MOORE, of Norwich, in the county of New London and State of Connecticut, have invented a new and useful Improvement in Valves, of which the following is a specification, reference being had to the accompanying drawings, forming part thereof.

My invention relates to what are known as "straight-way" or "gate" valves, in which the "water-way" or passage through the shell is opened and closed by a gate or similar device moving transversely to said passage; and it has for its object to construct a valve of this nature in which the gate or closing device has perfect freedom of movement, with a minimum amount of wear, in which fluid or liquid under pressure is, or may be, utilized to open and close the valve, and in which the pressure of the water which flows through the shell when the valve is open is utilized when the valve is closed to expand the gate or closing device, and thus insure a perfectly-tight joint between said closing device and the valve-seat.

To these ends my invention consists in a valve the shell of which is provided with two lateral cylindrical extensions upon opposite sides of its water-way, each of which extensions contains a piston, and the gate or closing device of which is composed of an expansible cylinder located between and connected with said pistons in such manner that fluid or liquid under pressure admitted into the outer end of one of said lateral extensions of the shell will move said pistons and gate in one direction to close the valve, and when admitted into the outer end of the opposite extension will move said pistons and gate in the reverse direction to open the valve, as hereinafter fully described, and particularly pointed out in the claims.

Figure 1:
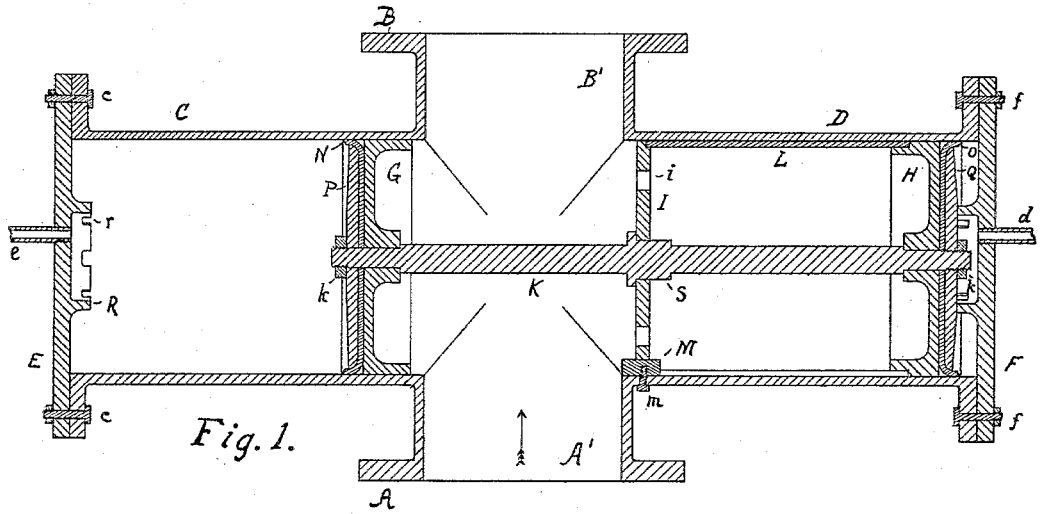
Figure 2:
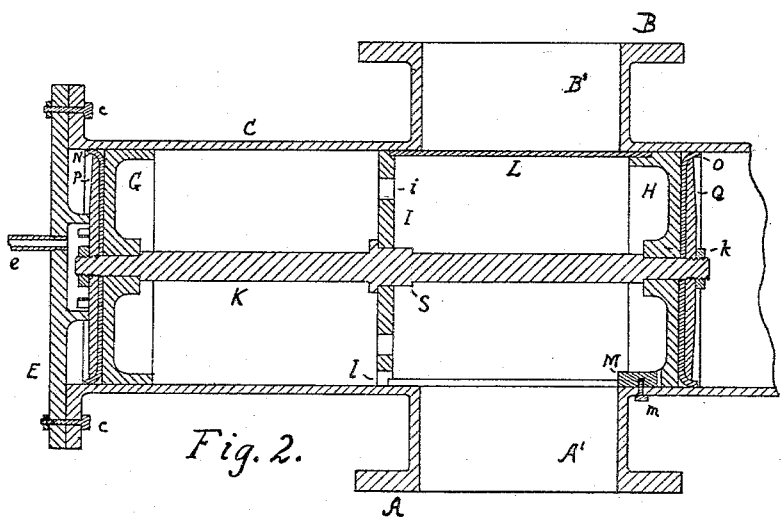
Figure 3:
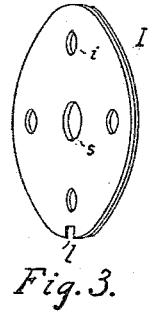
Figure 4:
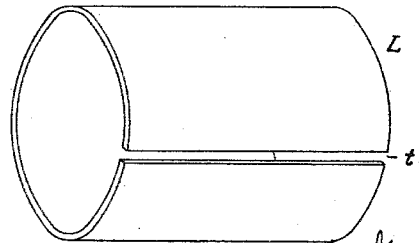

Referring to the drawings, in which like letters designate like parts in the several figures, Figure 1 is a central horizontal section of a valve constructed according to my invention, with the gate or closing device in its open position. Fig. 2 is a similar view thereof, broken away at one end, showing the gate closed. Fig. 3 is a perspective view of the disk supporting one end of the gate. Fig. 4 is a similar view of the expansible cylinder which constitutes the gate or closing device.

The letters A B designate the shell, and A' B' the inlet and outlet portions, respectively, of the water-way or passage therethrough.

The shell A B is provided between its ends with the oppositely-located lateral extensions C D, which are cylindrical in form, and preferably have an inner diameter slightly greater than that of the passage A' B' of the shell. At their outer ends the cylinders C D are provided with a peripheral flange, to which the cylinder-heads E F are secured by bolts *e f*, as shown; or other well-known means for securing a tight joint between the heads and the ends of the cylinders may be utilized.

Within cylinder C is located a piston-head, G, and within cylinder D is a corresponding piston-head, H, said piston-heads being connected together by a stem, K, extending across the passage through the shell. As shown, the stem K is provided at each end with a portion of reduced diameter, upon which are received the heads G H, packing-disks N O, and washers P Q, respectively, said parts being securely held in position by nuts *k*, turned upon the screw-threaded ends of the stem; but such construction is shown merely to illustrate one form of piston-head packing, and it will be understood that other means for causing the piston-heads to closely fit the bore of the cylinders may be employed, if desired.

The heads E F are preferably provided with circular flanges R upon their inner side, as shown, which contact with the washers P Q as the latter approach the ends of the cylinders, and prevent the packing-disks N O from being injured by contact of their periphery with the heads. The flanges R are provided with openings *r*, for a purpose presently to be described.

Midway between its ends the stem K is provided with a hub, S, upon which is seated a disk, I, of the same diameter as the piston-heads, said disk having a central orifice, *s*, to receive the stem, and in its preferred form a series of perforations, *i*, between the central orifice and its periphery, the function of which will be hereinafter described.

The letter L designates a cylinder, whose outer diameter is substantially that of the piston-heads and disk, said cylinder having an opening, t, in one side, extending throughout its length, as shown in Fig. 4, whereby it is adapted to be expanded by pressure exerted against its inner side.

One of the piston-heads—as, for example, the head H—and disk I have a peripheral groove in their adjacent sides, the depth of which corresponds to the thickness of the shell of cylinder L, and the latter is loosely held upon said head and disk within said grooves, as shown in Figs. 1 and 2, its end abutting against the vertical wall of the grooves. When thus supported, the periphery of cylinder L is flush with the periphery of the disk and head and closely fits the bore of cylinders C D.

The parts thus far described will be so proportioned that when the cylinder L is in the position shown in Fig. 2 its ends will overlap the ends of the passages A' B', as shown in said figure.

The opening t in cylinder L is designed to be substantially diametrical to the inlet-passage A' when the cylinder is in the position shown in Fig. 2, and therefore means must be employed for preventing axial movement of the cylinder. I have shown as one example of means for this purpose a guide-block, M, secured to the inner side of cylinder D by means of a screw, m, inserted through the latter, said block projecting within the opening t in cylinder L. Disk I is provided with a notch, l, in its periphery, to permit said disk to move over said guide-block to the position shown in Fig. 1.

The sliding movement by which the stem K and its attached parts are changed from the position shown in Fig. 1 to that shown in Fig. 2, and vice versa, is preferably caused by fluid or liquid under pressure, which is admitted alternately into cylinders C D through pipes e d, leading from the reservoir or other source of pressure and extending through the heads E F. As shown, said pipes enter the heads within the circle described by the flanges R, the openings r in the latter permitting the motive pressure to be exerted against the full area of the piston-heads at the beginning of their movement. The pipes d e will be provided with suitable outlets governed by check-valves or other means, whereby the exhaust movement of the motive fluid or liquid can take place through said pipes; or the cylinders C D may be provided with exhaust-ports in a well-known manner.

I have shown the valve provided with the pipes d e merely for the reason that the valve herein shown and described has been devised by me with special reference to use in connection with a filtering apparatus invented by me and shown and described in an application filed June 17, 1887, serially numbered 241,577, in which special provision is made for exhausting the fluid or liquid which operates the valve through the same pipes by which it is conveyed to the valve. It will be understood, therefore, that so far as the invention herein described and claimed is concerned any of the common exhaust devices may be connected to the pipes d e or directly to the cylinders C D.

The operation of the valve constructed as thus described is as follows: The parts being assembled, as shown in the drawings, the shell A B being connected to the pipes or other conductors of the water or other liquid with which the valve is to be used, and the pipes d e connected to the reservoir or other source of fluid or liquid under pressure, if the valve be open, as shown in Fig. 1, the motive fluid or liquid is admitted through pipe d to cylinder D, whereby its pressure is exerted against piston-head H and moves said head, stem K, cylinder L, and piston-head G to the position shown in Fig. 2. Such movement brings cylinder L to a position where its opening t is diametrical to the inlet-passage A' of the shell, and where its periphery opposite to said opening bears against the seat surrounding the outlet-passage B' and closes said passage. The water thus cut off from its passage through the shell enters cylinder L through the passage t and fills it, so that, in addition to the cylinder, a practically solid body of water having the dimensions of the interior of the cylinder is interposed as a gate between the inlet and outlet passages of the shell. Moreover, the pressure of the water against the interior surface of cylinder L causes the latter to expand to the fullest extent permitted by the bore of cylinders C D, which expansion insures the perfect closure of the passage A' B' by the cylinder L. To open the valve, the passage of the motive fluid or liquid through pipe d is cut off, and the same is permitted to enter cylinder C through pipe e, whereupon, by means of its pressure against piston-head G, the stem K and its attached parts are returned to their former position, (shown in Fig. 1,) and the water is permitted to again pass through the passage A' B' around that portion of stem K between piston-head G and disk I. The cylinder L remains practically full of water, but, upon being released from the pressure of the water in passage A', contracts to its former diameter. This contraction is facilitated by making the series of perforations i in the disk I, previously referred to, through which a portion of the water in the cylinder may be expelled, and I prefer to utilize such perforations, although the valve is operative without them.

When a perforated disk is used, that portion of cylinder C between the disk and piston-head G becomes more or less filled with water when the valve is closed, which water, when the parts are moved to open the valve, is expelled through the outlet-passage B'.

The weight of the water constantly filling or nearly filling cylinder L serves to balance the sliding parts and insure steadiness of movement thereto.

It will be observed that, there being no appreciable friction between the moving and stationary parts of the valve and no possibility of any binding action between them, a very light pressure exerted against the piston-heads is sufficient to operate the gate, and the valve is therefore especially adapted to be operated automatically in connection with such an apparatus as that shown in my application hereinbefore referred to.

I am aware that the use of an expansible cylinder as the gate or closing device of a valve is not broadly new, such a valve being shown in British Patent No. 973 of 1858, the cylinder in that case, however, being moved to open and close the valve by means of a manually-operated rod. I am also aware that valves have been constructed in which a disk-gate has been connected with a piston contained within a cylinder, said cylinder having means for admitting fluid or liquid under pressure to its opposite ends, whereby the disk is raised and lowered to open and close the valve, as shown in United States Patent No. 151,423. This latter construction is open to the very serious objection that the disk-gate, in common with all disk-gates, is liable to stick so closely to its seat that to exert sufficient pressure against the piston to raise it would be wholly impracticable; and, again, that the pressure exerted against the face of the disk, being at a right angle to the axis of the cylinder in which the piston is located, causes the piston to bind against the inner wall of the cylinder and seriously interferes with its perfect operation. The valve invented by me differs materially from either of these constructions, in that the expansible cylinder is accurately balanced between two pistons located upon opposite sides of the water-way through the shell in such manner that while it completely closes said water-way when occupying one of its positions it can be moved to open and close the valve with perfect ease without possibility of binding at any point, so that a very slight pressure upon the motive fluid or liquid is sufficient. In other words, I not only effect a great saving in the practical operation of the valve by obviating the necessity for an enormous pressure upon the gate-operating piston, but I also produce a valve which can be relied upon to properly perform its function under all circumstances, without liability of becoming inoperative through wear or binding of any of its parts.

It is obvious that modification of the various details of construction can be made within the scope of my invention.

Having thus fully described my invention, what I claim, and desire to secure by Letters Patent, is—

1. In a valve, the combination, with the shell having lateral extensions upon opposite sides of the water-way or passage therethrough, said extensions being in the form of cylinders closed at their outer ends, of a piston-head mounted within each of said cylinders, a stem connecting said piston-heads with each other, an expansible cylinder mounted upon and carried by said stem, and means for exerting pressure against said piston-heads alternately, whereby said expansible cylinder is moved in opposite directions to open and close the passage through the shell and is evenly balanced between said piston-heads, substantially as described.

2. In a valve, the combination, with the shell having lateral extensions upon opposite sides of the water-way or passage therethrough, said extensions being in the form of cylinders closed at their outer ends, a piston-head mounted within each of said cylinders, a stem connecting said piston-heads with each other, a gate consisting of an expansible cylinder mounted upon and carried by said stem, said expansible cylinder having an inlet-opening facing the inlet end of the passage through the shell, and inlet and exhaust pipes communicating with the cylindrical extensions of the shell, whereby fluid or liquid under pressure is admitted thereto to operate said piston-heads, substantially in the manner and for the purpose set forth.

3. In a valve, the combination, with the shell A B, having the lateral cylindrical extensions C D, of the piston-heads G H, stem K, a disk secured to said stem between its ends, expansible cylinder L, supported at one end by said disk and at the opposite end by one of the piston-heads, and pipes $d\ e$, communicating with the interior of cylinders C D, substantially as shown and described.

4. In a valve, the combination, with shell A B, cylinders C D, located upon opposite sides thereof, heads E F, secured to the outer ends of said cylinders and having the circular flanges R, provided with openings $r$, stem K, piston-heads G H, packing-disks N O, and washers P Q, secured to said stem at its ends, disk I, secured to said stem between its ends, expansible cylinder L, mounted upon said disk and one of the piston-heads, substantially in the manner shown and described, and pipes $e\ d$, extending through the heads of cylinders C D within the circle described by the flanges R, arranged and operating substantially as set forth.

5. In a valve, the combination, with the shell A B, having the laterally-extending cylinders C D, of piston-heads G H, located within said cylinders, stem K, connecting said piston-heads, disk I, and cylinder L, mounted upon said stem, said latter cylinder having the opening $t$, and a stop for preventing circumferential movement of said cylinder L, whereby its opening $t$ is retained in a plane substantially diametrical to the water-way or passage through the shell, substantially as and for the purpose described.

6. In a valve, the combination, with the shell having the lateral cylindrical extensions, the piston-heads located therein, the stem connecting said piston-heads and the disk, and expansible cylinder having opening $t$, mounted on said stem, arranged and operating substantially in the manner set forth, of guide-block M, secured to the inner wall of one of the cylindrical extensions and projecting within said opening $t$ of the expansible cylinder, substantially as described.

7. In a valve, the combination, with the shell A B, cylinders C D, stem K, piston-heads G H, disk I, having the perforations $i$, and cylinder L, having an inlet-passage in its side adjacent to the inlet-passage A' of the shell, of a guide for preventing circumferential movement of said cylinder L, and means for introducing fluid or liquid under pressure within the cylinders C D and for exhausting the same therefrom, substantially in the manner shown and described.

8. In a valve, the combination, with the shell A B, cylinders C D, stem K, piston-heads G H, and disk I, of the expansible cylinder L, having its ends located in peripheral grooves in said disk and one of said piston-heads, whereby the periphery of said cylinder is substantially in the plane of the peripheries of said disk and piston-heads, substantially as set forth.

GEORGE H. MOORE.

Witnesses:
   W. H. CHAPMAN,
   J. E. CHAPMAN.